(12) United States Patent
Jacobine et al.

(10) Patent No.: US 7,960,445 B2
(45) Date of Patent: Jun. 14, 2011

(54) DUAL CURE COMPOSITIONS EMPLOYING FREE RADICAL AND RTV CURE

(75) Inventors: Anthony F. Jacobine, Meriden, CT (US); John G. Woods, Farmington, CT (US); Steven T. Nakos, Andover, CT (US); Thomas Fay-Oy Lim, Killingworth, CT (US)

(73) Assignee: Henkel Corporation, Rocky Hill, CT (US)

( * ) Notice: Subject to any disclaimer, the term of this patent is extended or adjusted under 35 U.S.C. 154(b) by 561 days.

(21) Appl. No.: 11/572,738

(22) PCT Filed: Jul. 22, 2005

(86) PCT No.: PCT/US2005/025939
§ 371 (c)(1),
(2), (4) Date: Jan. 26, 2007

(87) PCT Pub. No.: WO2006/014786
PCT Pub. Date: Feb. 9, 2006

(65) Prior Publication Data
US 2007/0213493 A1    Sep. 13, 2007

(51) Int. Cl.
*C03C 25/10* (2006.01)
*C08L 83/00* (2006.01)
*C08F 8/30* (2006.01)

(52) U.S. Cl. ........... 522/42; 522/90; 522/91; 522/96; 522/97; 524/588; 524/590; 525/123; 525/455

(58) Field of Classification Search .............. 522/42, 522/97; 524/588, 590; 525/123, 455
See application file for complete search history.

(56) References Cited

U.S. PATENT DOCUMENTS

| | | |
|---|---|---|
| 4,528,081 A | 7/1985 | Lien et al. |
| 4,699,802 A | 10/1987 | Nakos et al. |
| 5,068,304 A | 11/1991 | Higuchi et al. |
| 5,461,691 A * | 10/1995 | Schunck et al. ............. 385/123 |
| 5,663,269 A | 9/1997 | Chu et al. |
| 6,140,444 A | 10/2000 | Levandoski et al. |
| 6,169,140 B1 | 1/2001 | Roesler et al. |
| 6,387,449 B1 * | 5/2002 | Reid et al. ................. 427/385.5 |
| 6,831,130 B2 | 12/2004 | Fujita et al. |
| 7,189,781 B2 * | 3/2007 | Acevedo et al. ............. 524/588 |
| 2004/0181007 A1 | 9/2004 | Acevedo et al. |

OTHER PUBLICATIONS

International Search Report dated Nov. 10, 2005.

* cited by examiner

*Primary Examiner* — Mark Eashoo
*Assistant Examiner* — Jessica Paul
(74) *Attorney, Agent, or Firm* — Steven C. Bauman

(57) ABSTRACT

The present invention relates to dual curing compositions, which cure with moisture and photo radiation, such as UV light, and methods for preparing and using same. In particular, the compositions of the present invention contain a polyether or polyester backbone, photocurable portion(s) and moisture curable portion(s). The photo curable portion is a urethane or carbamate linkage terminated with a (meth)acryloxyalkyl group. The moisture curable portion is either: (1) a portion terminated with a polyalkoxysilyl group; or (2) a portion having a urea linkage terminated with an alkylpolyalkoxysilyl group.

11 Claims, No Drawings

DUAL CURE COMPOSITIONS EMPLOYING FREE RADICAL AND RTV CURE

BACKGROUND OF THE INVENTION

1. Field of the Invention

The present invention relates to dual curing compositions and methods for preparing and using same. The compositions of the present invention cure by exposure to moisture and/or radiation in the electromagnetic spectrum, e.g., ultraviolet (UV) light, to provide flexible polyether or polyester resins.

2. Brief Description of Related Technology

A variety of silicone compositions have been developed that may be used as sealants, conformal coatings, potting compounds, and the like. Among the numerous silicone compositions that have evolved, some depend on atmospheric humidity and/or moisture to be present on the substrate to which the composition is applied, for their cure. Although such moisture-curing silicone systems provide good physical properties and performance when fully cured, they suffer the disadvantage that the moisture curing process is relatively slow.

As a consequence, silicone compositions that depend on other curing processes have been developed which are significantly faster than the moisture-curing process. In particular, photocurable (e.g., UV-curable) silicones have been developed which offer a fast curing speed, far superior to conventional moisture-curing silicone. These silicone compositions may include a photoinitiator that provides a faster and more effective cure. Silicone compositions that are both moisture-curable and photo-curable have also been developed that provide a rapid cure. Examples of these are described in U.S. Pat. No. 5,663,269 to Chu, et al. (Chu); U.S. Pat. No. 6,140,444 to Levandoski, et al. (Levandoski); U.S. Pat. No. 4,528,081 to Lien et al. (Lien) and U.S. Pat. No. 4,699,802 to Nakos et al. (Nakos), all of which are hereby expressly incorporated herein by reference.

The need for dual curing compositions has increased as additional applications in the automotive, structural engineering and electronic industry have been identified. The present invention provides new dual curing resins, which are useful in these and other applications.

SUMMARY OF THE INVENTION

The present invention provides a class of dual curing polyether or polyester resin compositions, which possess the advantages of both moisture curing and photo curing. Photocure allows substrates to be sealed rapidly upon exposure to the appropriate amount and wavelength of light. Moisture cure ensures cure, even in shadowed areas and can be accomplished without use of heat. These dual curing compositions cure to a flexible polyether or polyester resin useful in a variety of sealant and adhesive applications.

In one aspect of the present invention, there is provided a composition of matter including the structure:

$$A\!-\!\!(\!R^1\!-\!R^2)_n \qquad (I)$$

where A is a polyether or polyester polyol backbone; $R^1$ is a carbamoyl containing linkage; and $R^2$ is (i) an alkylene (meth)acrylate terminated urethane containing linkage; (ii) an alkylene alkoxy silyl terminated linkage; or (iii) an alkylene alkoxysilyl terminated urea containing linkage, provided that at least one of group (i) and at least one of groups (ii) or (iii) are present, and n is >2 up to 6.

In another aspect of the present invention, there is provided a composition of matter including the structure:

$$A\!-\!\!(\!R^{1a}\!-\!R^{2a})_n \qquad (I^a)$$

where A is a polyether or polyester polyol backbone; $R^{1a}$ is a hydrocarbon diradical joined to A through a carbamoyl linkage; and $R^{2a}$ is selected from (i) a photocurable portion comprising a urethane or carbamate linkage terminated with a (meth)acryloxyalkyl group; (ii) a moisture curable portion terminated with a polyalkoxysilyl group; and (iii) a moisture curable portion comprising a urea linkage terminated with an alkylpolyalkoxysilyl group, provided that there are present (a) at least two photo curing portions and at least one moisture curing portion; or (b) at least two moisture curing portions from the same group and at least one photo curing portion, and n is >2 up to 6.

In yet another aspect of the present invention, there is provided a composition of matter including the structure:

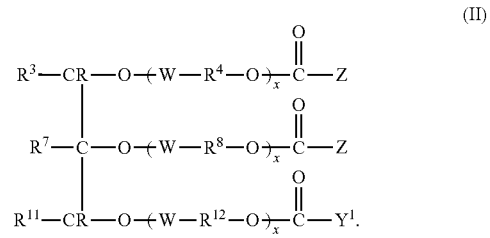

(II)

where $R^3$, $R^7$ and $R^{11}$ may be the same or different and are each H or $C_{1-6}$ alkyl; $R^4$, $R^8$ and $R^{12}$ may be the same or different and are each alkylene $C_{1-6}$; R is H or

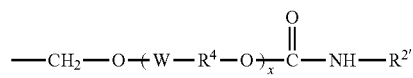

which may be further substituted by R to extend the polyol backbone up to six total alcohol groups per each polymeric structure, and where $R^{2'}$ is:
(i) an alkylene (meth)acrylate terminated urethane containing linkage; or
(ii) an alkylenealkoxysilyl terminated linkage;
W is a free valency or

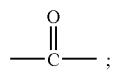 ;

x is 1-40;

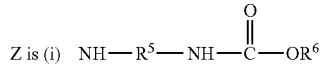

-continued or (ii) 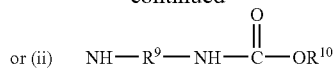

R$^5$ and R$^9$ may be the same or different and are C$_{2\text{-}20}$ substituted or unsubstituted divalent organic radicals; R$^6$ and R$^{10}$ are each (meth)acryloxyalkyl groups; Y$^1$ is: NH—R$^{13}$; R$^{13}$ is

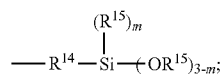

m=0, 1; and R$^{14}$ and R$^{15}$ are C$_1$-C$_3$ alkyl.

In another aspect of the present invention, there is provided a composition of matter including the structure:

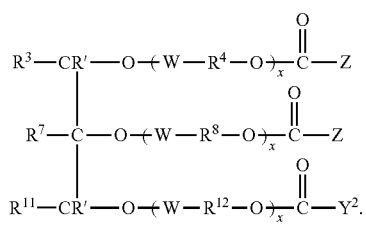 (III)

where R$^3$, R$^7$ and R$^{11}$ may be the same or different and are each H or C$_{1\text{-}6}$ alkyl; R$^4$, R$^8$ and R$^{12}$ may be the same or different and are each alkylene C$_{1\text{-}6}$; R' is H or

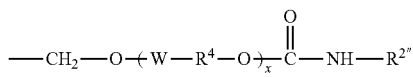

which may be further substituted by R' to extend the polyol backbone up to six total alcohol groups per each polymeric structure; and where R$^{2''}$ is:

(i) an alkylene (meth)acrylate terminated urethane containing linkage; or (ii) an alkylenealkoxysilyl terminated urea containing linkage;

W is a free valency or

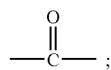

x is 1-40;

Z is (i) NH—R$^5$—NH—C(=O)—OR$^6$
or (ii) NH—R$^9$—NH—C(=O)—OR$^{10}$

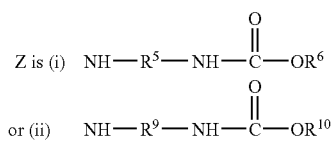

R$^5$, R$^9$ and R$^{16}$ may be the same or different and are C$_{2\text{-}20}$ substituted or unsubstituted divalent organic radicals; R$^6$ and R$^{10}$ are each (meth)acryloxyalkyl groups;

Y$^2$ is

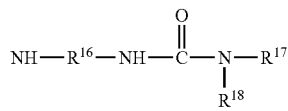

R$^{17}$ is a C$_{1\text{-}13}$ alkylpolyalkoxysilyl group; and R$^{18}$ is a C$_{1\text{-}10}$ alkyl or cycloalkyl group.

In another aspect of the present invention, there is provided a process for preparing a composition of matter including the steps of (1) reacting a poly(alkylene ether) polyol or poly (alkylene ester) polyol, with a monoisocyanate intermediate containing a (meth)acryloxyalkyl terminal group joined to the monoisocyanate through a urethane linkage, to form a first reaction product having remaining hydroxyl functionality; and (2) reacting the first reaction product with an isocyanatoalkylpolyalkoxy silane to form a second reaction product having free-radical curing and moisture curing groups.

In yet another aspect of the present invention, there is provided a process for preparing a composition of matter including the steps of (1) reacting a poly(alkylene ether) polyol or a poly(alkylene ester) polyol with a diisocyanate, where for every equivalent of hydroxy there is one-mole of diisocyanate, to form a first reaction product with isocyanate functionality; (2) reacting the first reaction product with a hydroxyalkyl (meth)acrylate to form a second reaction product having remaining isocyanate functionality; and (3) reacting the second reaction product with an equivalent amount of aminoalkylpolyalkoxysilane to form a dual curing composition.

In accordance with another aspect of the present invention, there is provided a composition of matter including the reaction product of (1) a polymerizable product corresponding in structure to a reaction product of (a) a poly(alkylene ether) polyol or poly(alkylene ester) polyol; and (b) a monoisocyanate intermediate containing a (meth)acryloxyalkyl terminal group joined to the monoisocyanate through a urethane linkage, the product of (a) and (b) having remaining hydroxyl functionality and subsequently being reacted with an isocyanatoalkylpolyalkoxysilane; and (2) a cure system.

In still another aspect of the present invention, there is provided a composition of matter including the reaction product of (1) a polymerizable product corresponding in structure to a reaction product of (a) a poly(alkylene ether) polyol or a poly(alkylene ester) polyol; and (b) a diisocyanate, where for every equivalent of hydroxy there is one mole of diisocyanate, the product of (a) and (b) having isocyanate functionality and subsequently being reacted with an equivalent amount of aminoalkylpolyalkoxy silane; and (2) a cure system.

In another aspect of the present invention, there is provided a method of forming a gasket assembly, including the steps of (a) applying the composition of the present invention to at least one of two substrate surfaces; (b) exposing the composition to moisture and/or photoradiation to effectuate at least partial cure; and (c) mating the substrate surfaces in abutting relationship to form the gasket assembly.

In yet another aspect of the present invention, there is provided a method for using the compositions of the present invention to seal together two substrates, including the steps of (a) applying the composition to at least one of two substrate surfaces; (b) mating the substrate surfaces in abutting relationship to form an assembly; (c) exposing the composition to moisture and/or photoradiation; and (d) maintaining the abutting relationship for a time sufficient to allow the composition to cure.

DETAILED DESCRIPTION OF THE INVENTION

The present invention is directed to dual curing, i.e., moisture and photo curing, compositions that provide flexible polyether or polyester resins. The dual curing compositions of the present invention contain a polyether or polyester backbone. The compositions also contain photo curable portion(s) and moisture curable portion(s).

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing.

The dual curing compositions of the present invention include prepolymers of formula (I), represented as:

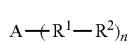

(I)

where A is a polyether or polyester backbone;
$R^1$ is a carbamoyl containing linkage; and
$R^2$ is:

(i) an alkylene (meth)acrylate terminated urethane containing linkage;

(ii) an alkylenealkoxysilyl terminated linkage; or (iii) an alkylenealkoxysilyl terminated urea containing linkage.

At least one of group (i) and at least one of groups (ii) or (iii) are present in the compounds of formula (I), and n is >2 up to 6. Desirably, groups (ii) and (iii) are not both present in formula (I).

More specifically, polyethers or polyesters of formula (I) include at least one of each of a photo curable portion and a moisture curable portion. The photocurable portion is a urethane or carbamate linkage terminated with a (meth)acryloxyalkyl group, represented by group (i) in the above definitions. The moisture curable portion is either a portion terminated with a polyalkoxysilyl group or a portion having a urea linkage terminated with an alkylpolyalkoxysilyl group, represented by groups (ii) and (iii) respectively in the above definitions. Because n is greater than 2, compounds of formula (I) include (a) at least two photocurable portions and at least one moisture curable portion; or (b) at least two moisture curing portions from the same group, i.e., group (ii) or (iii), and at least one photo curing portion.

The polyether or polyester backbone of formula (I) may be any conventional polyether or polyester known to those skilled in the art. Examples of suitable polyether or polyester polyols include, but are not limited to: polypropylene oxide polyol (such as PLURACOL TP 2540, commercially available from BASF); poly(tetramethylene)ether glycol; poly(ethylene)ether glycol; poly(1,2-propylene)ether polyol; and poly(1,2-or 1,3-butylene)ether glycol. Desirably, the polyether or polyester backbone contains up to six total alcohol groups per each polymeric structure.

The carbamoyl containing linkage in formula (I) may be represented as:

More specifically, $R^1$ in formula (I) is a hydrocarbon diradical joined to A through a carbamoyl linkage, as represented above.

The alkylene(meth)acrylate-terminated urethane-containing linkage in formula (I) may be represented as:

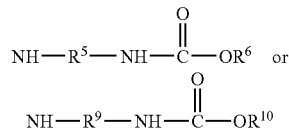

where $R^5$ and $R^9$ may be the same or different and are $C_{2-20}$ substituted or unsubstituted divalent organic radicals; and $R^6$ and $R^{10}$ are each (meth)acryloxyalkyl groups. The alkylene (meth)acrylate-terminated urethane-containing linkage is formed by reacting a diisocyanate with an hydroxyalkyl (meth)acrylate in amounts sufficient for retaining isocyanate functionality.

Desirably, the diisocyante is isophorone diisocyanate. Other suitable diisocyanates include, but are not limited to: phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclohexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane.

The hydroxyalkyl(meth)acrylate may be hydroxyethyl acrylate, hydroxymethyl acrylate, hydroxymethyl methacrylate, or any other suitable hydroxyalkyl(meth)acrylate. The term (meth)acrylate is intended to mean methacrylate and acrylate.

The alkylene alkoxy silyl terminated linkage in formula (m) may be represented as:
NH—$R^{13}$,
where $R^{13}$ is:

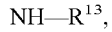

m is 0 or 1, and not 2; and $R^{14}$ and $R^{15}$ are $C_1$-$C_3$ alkyl.

The alkylene alkoxy silyl-terminated urea-containing linkage in formula (I) may be represented as:

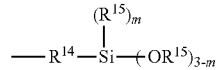

where $R^{16}$ is a $C_{2-20}$ substituted or unsubstituted divalent organic radical; $R^{17}$ is a $C_{1-13}$ alkylpolyalkoxysilyl group; and $R^{18}$ is a $C_{1-10}$ alkyl or cycloalkyl group.

Particularly suitable compositions of the present invention include curable polymers of formula (II), which is represented as:

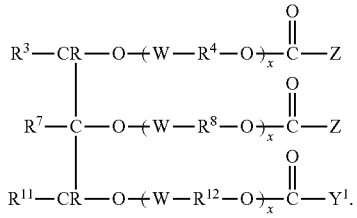 (II)

where $R^3$, $R^7$ and $R^{11}$ may be the same or different and are each H or $C_{1-6}$ alkyl; $R^4$, $R^8$ and $R^{12}$ may be the same or different and are each alkylene $C_{1-6}$; R is H or

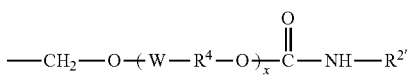

which may be further substituted by R to extend the polyol backbone up to six total alcohol groups per each polymeric structure, and where $R^{2'}$ is:

(i) an alkylene (meth)acrylate terminated urethane containing linkage; or (ii) an alkylenealkoxysilyl terminated linkage;

W is a free valency or

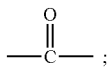

x is 1-40; Z is:

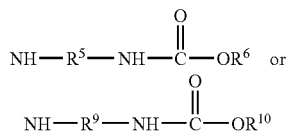

$Y^1$ is: $NH-R^{13}$;

and the remaining R groups are as defined above.

Also desirable are curable polymers of formula (III), represented as:

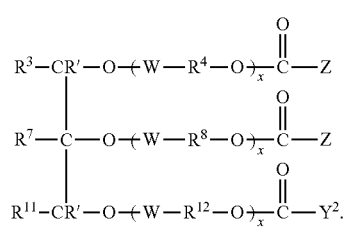 (III)

where R' is H or

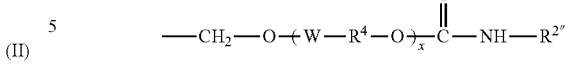

which may be further substituted by R' to extend the polyol backbone up to six total alcohol groups per each polymeric structure; and where $R^{2''}$ is:

(i) an alkylene (meth)acrylate terminated urethane containing linkage; or (ii) an alkylenealkoxysilyl terminated urea containing linkage; and $Y^2$ is:

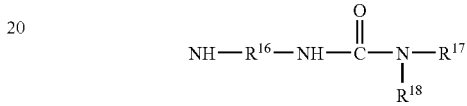

and the remaining groups are as defined above.

The dual curing compositions of the present invention cure to a flexible resin via free-radical and RTV (room temperature vulcanizing) mechanisms. Accordingly, the dual curing compositions of the present invention may optionally include a cure system, including photoinitiators, free radical initiators, moisture cure catalysts, and/or stabilizers. Examples of suitable photoinitiators include, but are not limited to, carbonyl-containing ultraviolet-activated free-radical generators, such as acetophenone, benzophenone, and the benzoin esters. Other useful initiators are free radical initiators, such as peroxy initiators, including diacyl peroxides such as benzoyl peroxide, dialkyl peroxides such as di-tert-butyl peroxide; ketone peroxides such as methyl ethyl ketone peroxide; and peresters which readily hydrolyze, e.g., tert-butyl peracetate, tert-butyl perbenzoate, di-tert-butyl diperphthalate, etc. A particularly useful class of peroxy initiators are the organic hydroperoxides such as cumene hydroperoxide, methyl ethyl ketone hydroperoxide, tert-butyl hydroperoxide, etc. Of these, cumene hydroperoxide is especially useful. Such free radical initiators are used with heat to initiate polymerization. The initiators may be used at a concentration of about 0.01 percent to about 10 percent by weight of the total formulation, desirably about 0.1 percent to about 5 percent by weight.

Suitable moisture cure catalysts include, but are not limited to: organic titanium derivatives and organic tin derivatives. The compositions also may include stabilizers, such as quinone or hydroquinone stabilizers or the like.

The dual curing compositions may be used, for example, to seal or bond substrates, such as, but not limited to, gaskets. In gasketing applications, the dual curing composition may be applied to one of the substrates which will form part of the gasket, cured or at least partially cured, and then joined to a second substrate to form the gasket assembly. Such gasketing applications include, for example, form-in-place gaskets.

Coatings, adhesive joints and potting compositions may also be made from the inventive compositions. For instance, the compositions may be applied to a substrate and subjected to curing conditions. The compositions may also be used to seal together substrates by applying the composition to at least one of two substrate surfaces, mating the substrate surfaces in an abutting relationship to form an assembly, and exposing the composition to moisture and/or photoradiation to effect cure. The substrates should be maintained in the abutting relationship for a time sufficient to effect curing.

Synthesis

The moisture and/or photocuring polymer compositions of the present invention may be formed by at least two synthetic approaches.

SCHEME 1
A polyether polyol or polyester polyol may be reacted with a preformed acrylated monoisocyanate (step 1) such that 30 to 70% of hydroxy equivalent remain in the product (step 2) followed by further modification of this product by reaction with an isocyanotoalkyltrialkoxysilane as shown in step 3.

Step 1:

$$HOR^6 + OCN-R^5-NCO \longrightarrow OCN-R^5-NH\overset{O}{\underset{\|}{C}}-OR^6$$
(IV)        (V)                              (VI)

Step 2:

$$R^3-CR\text{---}[O\text{---}(W-R^4-O)_x\text{---}H]_q$$
$$R^7-C\text{---}[O\text{---}(W-R^8-O)_x\text{---}H]_s \quad +$$
$$R^{11}-CR\text{---}[O\text{---}(W-R^{12}-O)_x\text{---}H]_t$$
(VII)

$$OCN-R^5-NH\overset{O}{\underset{\|}{C}}-OR^6 \longrightarrow$$
(VI)

Step 2:

$$R^3-CR\text{---}[O\text{---}(W-R^4-O)_x\text{---}\overset{O}{\underset{\|}{C}}-NH-R^5-NH-\overset{O}{\underset{\|}{C}}-OR^6]_q$$
$$R^7-C\text{---}[O\text{---}(W-R^8-O)_x\text{---}\overset{O}{\underset{\|}{C}}-NH-R^5-NH-\overset{O}{\underset{\|}{C}}-OR^6]_s$$
$$R^{11}-CR\text{---}[O\text{---}(W-R^{12}-O)_x\text{---}H]_t$$
(IX)

Step 3:

$$R^3-CR\text{---}[O\text{---}(W-R^4-O)_x\text{---}\overset{O}{\underset{\|}{C}}-NH-R^5-NH-\overset{O}{\underset{\|}{C}}-OR^6]_q$$
$$R^7-C\text{---}[O\text{---}(W-R^8-O)_x\text{---}\overset{O}{\underset{\|}{C}}-NH-R^5-NH-\overset{O}{\underset{\|}{C}}-OR^6]_s \quad +$$
$$R^{11}-CR\text{---}[O\text{---}(W-R^{12}-O)_x\text{---}H]_t$$
(IX)

$$OCN-R^{14}-\underset{(R^{15})_m}{\overset{|}{Si(OR^{15})_{3-m}}}$$
(X)

-continued $$R^3-CR\text{---}[O\text{---}(W-R^4-O)_x\text{---}\overset{O}{\underset{\|}{C}}-NH-R^5-NH-\overset{O}{\underset{\|}{C}}-OR^6]_q$$
$$R^7-C\text{---}[O\text{---}(W-R^8-O)_x\text{---}\overset{O}{\underset{\|}{C}}-NH-R^5-NH-\overset{O}{\underset{\|}{C}}-OR^6]_s$$
$$R^{11}-CR\text{---}[O\text{---}(W-R^{12}-O)_x\text{---}\overset{O}{\underset{\|}{C}}-NH-R^{14}-\underset{(R^{15})_m}{\overset{|}{Si(OR^{15})_{3-m}}}]_t$$

(XII) (Inventive Reaction Product)

where W is a free valency or $$-\overset{O}{\underset{\|}{C}}-\quad;$$

$R^3, R^4, R^5, R^6, R^7, R^8, R^9, R^{10}, R^{11}, R^{12}, R^{14}, R^{15}$, x and m are as defined above; q is 0.1 to 1, s is 0.1 to 1, and t is 0.1 to 1, where q, s and t together are no more than 3; and R is H or $$-CH_2-O\text{---}(W-R^4-O)_x\text{---}\overset{O}{\underset{\|}{C}}-NH-R^{2'}$$

which may be further substituted by R to extend the polyol backbone up to six total alcohol groups per each polymeric structure, and where $R^{2'}$ is:

(i) an alkylene(meth)acrylate terminated urethane containing linkage; or (ii) an alkylenealkoxysilyl terminated linkage.

The R group may extend the polyether or polyester polyol backbone to include more than three alcohol groups, such as four, five or six alcohol groups. Desirably, $R^{14}$ is methylene and $R^{15}$ is methyl. The inventive reaction product may contain a mixture of reactive polymers having different percentages of endgroups within the defined ranges.

Scheme 1 prepares a polyether or polyether ester polyol end-capped with urethane-containing (meth)acryloxy and trialkoxy silane units.

For example, the product of scheme 1, where:

R, $R^3$ and $R^{11}$ are hydrogen;

$R^7$ is an ethyl unit;

$R^4, R^8$ and $R^{12}$ are isopropylene units, $$-CH_2\overset{CH_3}{\underset{|}{CH}}-$$

$R^5$ is an isophoronyl diradical;

$R^6$ is a (meth)acryloxyethyl group;

$R^{14}$ is a methylene linkage;

$R^{15}$ is a methyl group;

W is a free valency or

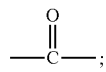

and
x=20, q=0.1 to 1, s=0.1 to 1, t=0.1 to 1, is represented as:

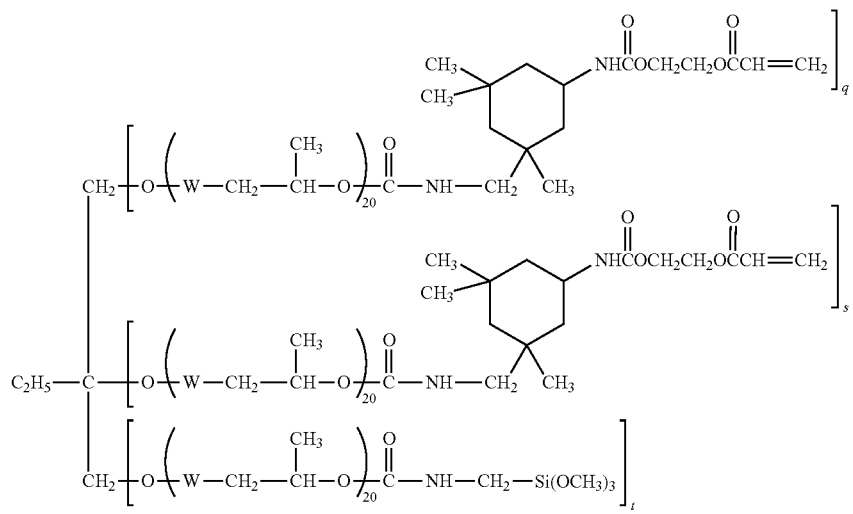

(XIII) (Inventive Reaction Product)

The reaction product (XIII) is a polyether or polyester end-capped with urethane-containing acryloxy units and urethane-containing trimethoxy silane units.

SCHEME 2
A polyether polyol or polyester polyol may be reacted with twice the number of equivalents of a diisocyanate to completely consume available hydroxy equivalent in the polyol (step 1) and followed by further modification of this product, with hydroxy alkyl (meth)acrylate as shown in step 2, and subsequent reaction of this intermediate product with a N-alkylaminoalkyl trialkoxy silane (step 3), to yield a final product.

Step 1:

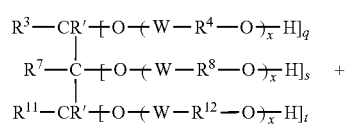

(VII)

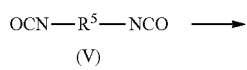

(V)

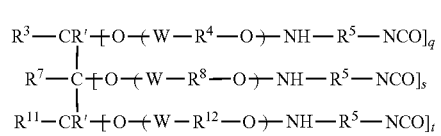

(XIV)

-continued

Step 2:

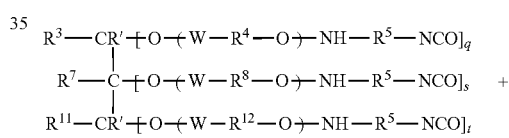

(XIV)

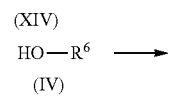

(IV)

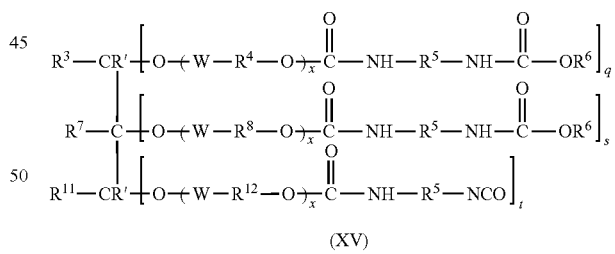

(XV)

Step 3:

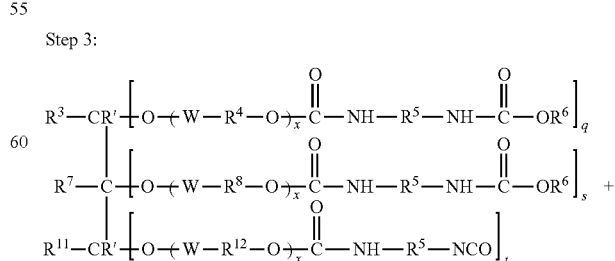

(XV)

-continued

(XVI)

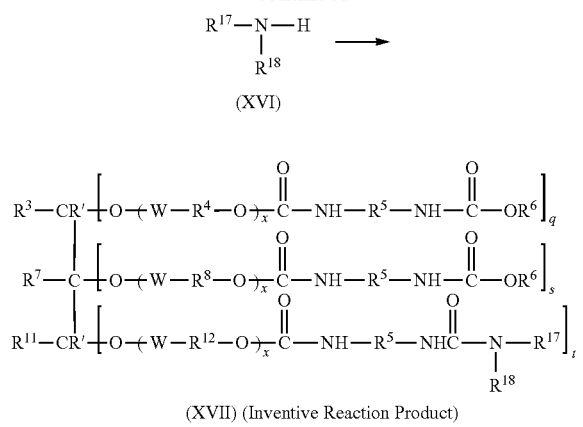

(XVII) (Inventive Reaction Product)

where R' is H or

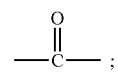

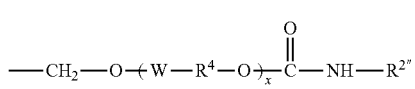

which may be further substituted by R' to extend the polyol backbone up to six total alcohol groups per each polymeric structure; and where $R^{2''}$ is:

(i) an alkylene (meth)acrylate terminated urethane containing linkage; or (ii) an alkylenealkoxysilyl terminated urea containing linkage.

All remaining groups are as defined above.

Scheme 2 prepares a polyether or polyether ester end-capped with urethane-containing acryloxy units and urethane-and urea-containing trialkoxy silane units.

For example, the product of scheme 2, where:
$R'$, $R^3$ and $R^{11}$ are hydrogen;
$R^7$ is an ethyl unit;
$R^4$, $R^8$ and $R^{12}$ are isopropylene units, $$-CH_2CH- \atop |\ CH_3$$

$R^5$ is an isophoronyl diradical;
$R^6$ is a (meth)acryloxyethyl group;
$R^{17}$ is a methylenetrimethoxysilane unit;
$R^{18}$ is a cychohexyl group;
W is a free valency or $$-\overset{O}{\underset{\|}{C}}- \ ;$$

and
x=20, q=0.1 to 1, s=0.1 to 1, t=0.1 to 1, is represented as:

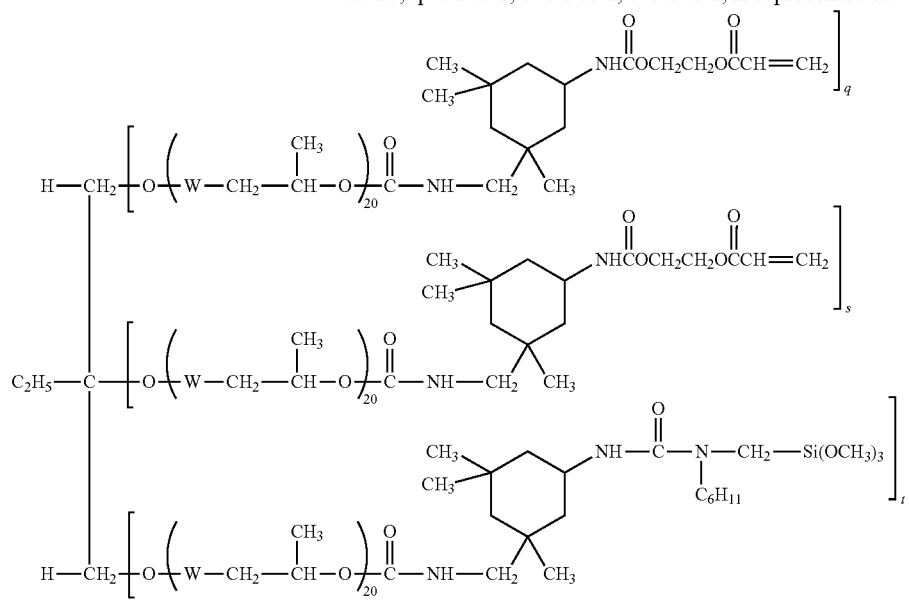

(XVIII) (Inventive Reaction Product)

The inventive reaction product (XVII) is a dual curing polyether or polyester end-capped with urethane-containing acryloxy units and urethane-and urea-containing trimethoxysilane units.

As will be shown in the examples below, the hydroxy equivalent concentration (e.g., polyether polyol, PLURACOL TP 2540) can be controlled to produce a dual curing polymer composition which can contain (meth)acrylate and trimethoxysilane end caps at various mole ratios, e.g., 50% acrylate, 50% trimethoxysilane, 67% acrylate, 33% trimethoxysilane and 33% acrylate and 67% trimethoxy silane, or from 10/90 to 90/10 mole ratios of acrylate to trimethoxysilane.

EXAMPLES

Example 1

A dual curing composition of the present invention was prepared in accordance with the following process, which followed reaction scheme 1, as described above.

Step 1:

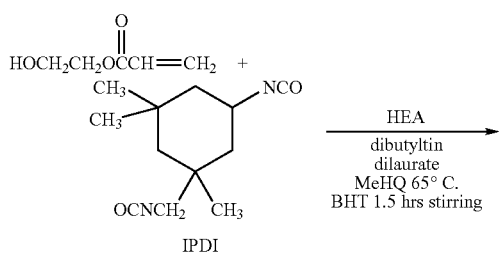

IPDI

Step 2:

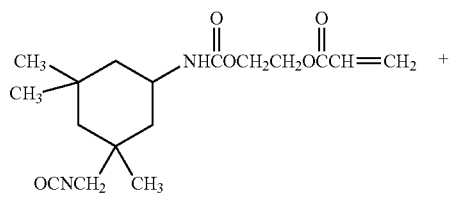

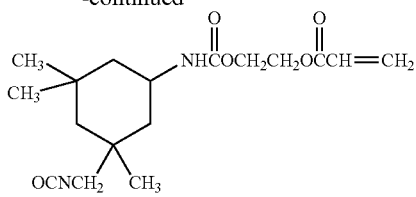

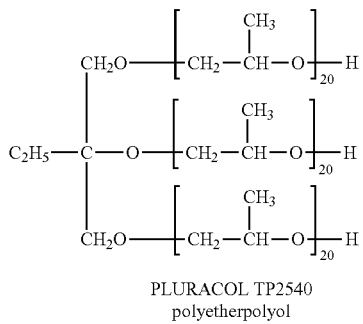

PLURACOL TP2540
polyetherpolyol

| bismuth
| octoate

90° C.,
3 hrs
stirring

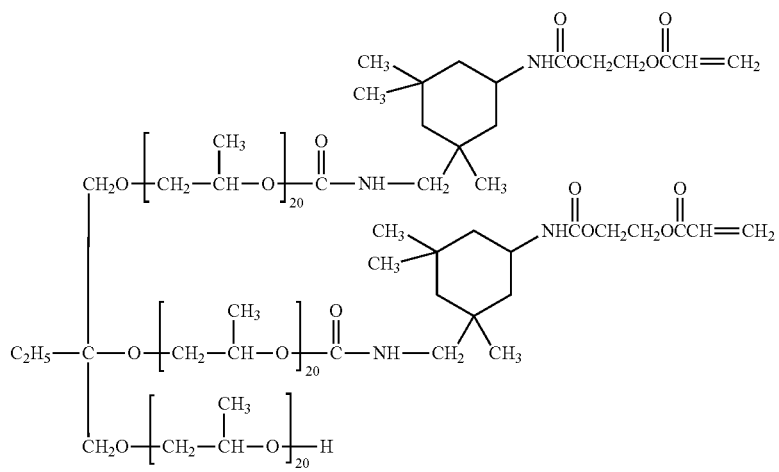

Step 1: Into a 3-neck flask equipped with a stirrer, dry nitrogen inlet, reflux condenser and drying tube was added isophorone diisocyanate (IPDI), (32.52 g, 0.146 mole, 0.293 equivalent) while stirring, followed by 2-hydroxyethyl acrylate (HEA) (17.0 g 0.146 mole, 0.146 equivalent), BHT (stabilizer) (0.01 g), methyl hydroquinone, (0.01 g), dibutyltin dilaurate (0.01 g) in an atmosphere of dry nitrogen, maintaining the reaction mixture below 80° C. in an ice-bath to control the exotherm. After the initial reaction, the reaction mixture was maintained at 65° C. for 1.5 hours while stirring under dry nitrogen.

Step 2: The cooled reaction mixture was titrated for isocyanate content to determine the quantity of polyether polyol (PLURACOL TP2540) to be added. Then the calculated amount of polyol, PLURACOL TP2540 (238.86 g, 0.089 mole, 0.271 equivalent) and bismuth octoate (0.06 g) were added and the temperature was raised to 90° C. and maintained at this temperature while stirring for three hours. The reaction mixture was checked for residual isocyanate content by infrared spectroscopy and was found to be free of isocyanate functionality.

TABLE 1

| | |
|---|---|
| theoretical molecular weight w/mole | 3512.4 |
| wt % polyol segment | 74.5 |
| theoretical wt % residual isocyanate | 0.178 |
| wt % reacted methanol | 5.28 |

This example provided a dual curing oligomer composition in which there are approximately 50 mole % (meth)acrylate endgroups and 50 mole % trimethoxysilane endgroups, i.e., p is 1.5 to 1.5 (meth)acrylate endgroups to trimethoxysilane end groups. The reaction product contains a mixture of reactive polymers having different percentages of endgroups within the defined ranges.

Step 3:

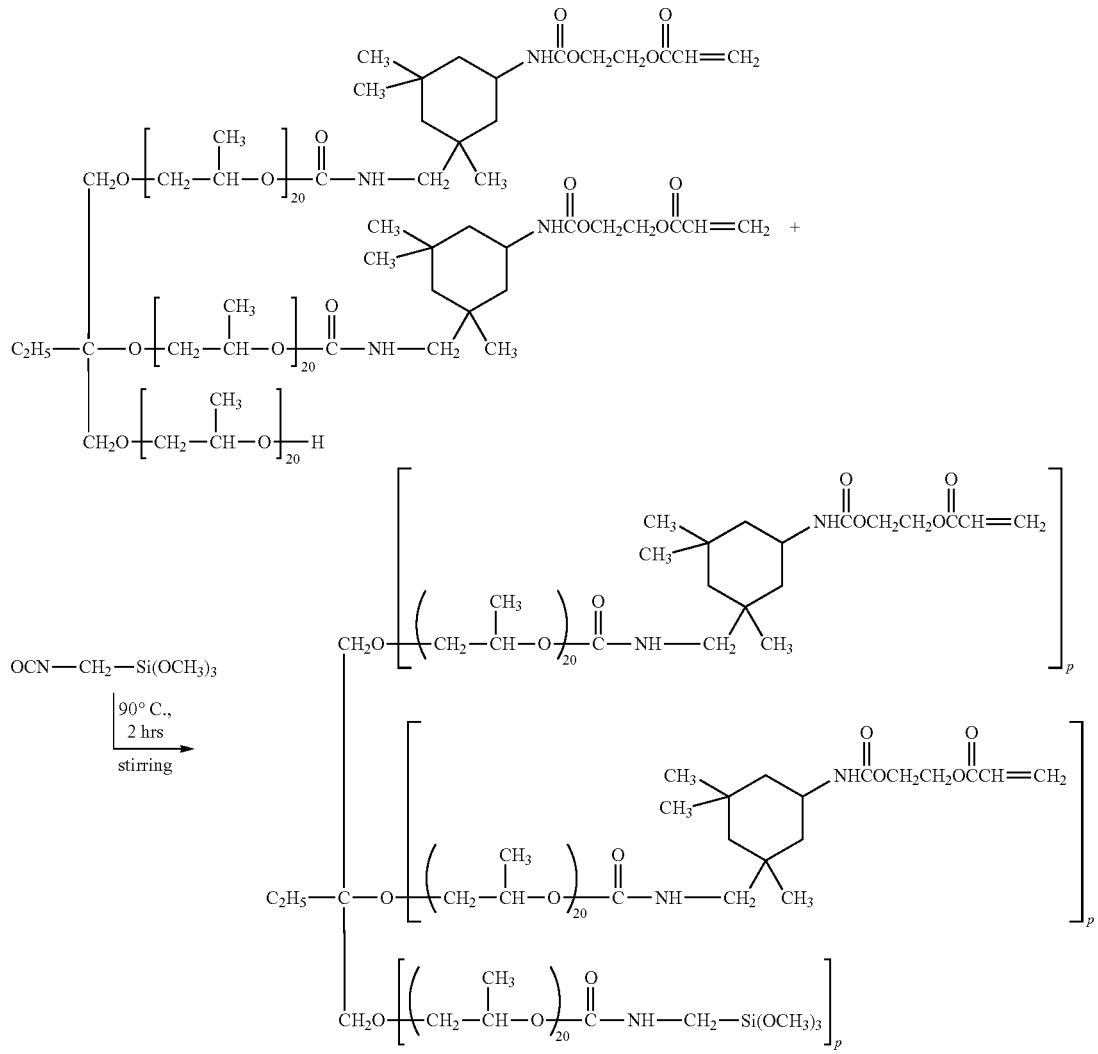

where p is independently selected from 0.1 to 2.99, desirably 0.5 to 2.5, and more desirably 1 to 2, and all three p groups together are no more than 3.

Step 3: Finally, to this reaction mixture was added isocyanatomethyltrimethoxysilane (32.26, 0.149 mole, 0.149 equivalent) and the reaction mixture was allowed to stir at 90° C. for an additional two hours, yielding 296.9 g or a polymer composition containing dual curing functionality, a 92.6% yield. This oligomer composition contains less than 0.2 wt % isocyanate content as was determined by infrared spectroscopy. Some properties of the oligomer composition are as follows:

Example 2

The process described in Example 1 is followed except that in step 2, the quantity of polyol (PLURACOL TP 2540) added is 193.12 g (0.072 mole, 0.219 equivalent), and of bismuth octoate, 0.05 g. The temperature is then raised to 90° C. and maintained at this temperature while stirring for three hours.

The reaction mixture is checked for residual isocyanate content by infrared spectroscopy and is found to be free of isocyanate functionality. Finally, to this reaction mixture is added isocyanatomethyltrimethoxysilane (17.8 g, 0.0823 mole) and the reaction mixture is allowed to stir for an additional two hours yielding 242.2 g (93%) of a dual curing polymer composition, which contains approximately 67 mole % of methacrylate end caps and 33 mole % of trimethoxysilane endgroups. This polymer composition contains less than 0.2 weight % isocyanate content as is determined by infrared spectroscopy. This example yields a product with approximate molecular weight of 3457 g/mole, a polyol content of about 74%, and a methanol content of about 3.0%.

Example 3

The process described in Example 1 is followed except that in step 2, the quantity of polyol (PLURACOL TP2560) added is 385.3 g (0.1437 mole, 0.437 equivalent) and of bismuth octoate is 0.096 g. The temperature is then raised to 90° C. and maintained at this temperature for three hours. The reaction mixture is checked for residual isocyanate content by infrared spectroscopy and is found to be free of isocyanate functionality, as expected. Finally, to this mixture is added isocyanatomethyltrimethoxysilane (71.3 g, 0.330 mole, 0.330 equivalent), and the mixture is allowed to stir for an additional two hours yielding 404.5 g (93%) of a dual curing polymer composition which contains approximately 33 mole % of acrylate endgroups and 67 mole % of trimethoxysilane endgroups. The polymer composition contains less than 0.2 weight % isocyanate content as is determined by infrared spectroscopy. This example yields a product with an approximate molecular weight of 3450 g/mole, a weight % polyol content of about 80% and a methanol content of about 7.2 weight %.

Example 4

An intermediate for preparation of dual curing compositions of the present invention is prepared in accordance with reaction scheme 2, step 1, described above.

Into a 3 neck flask equipped with a stirrer, dry nitrogen inlet and reflex condenser and drying tube, is added polyether polyol (PLURACOL TP 2540) (238.86 g. 0.089 mole, 0.271 equivalent), methylhydroquinone, (0.01 g), BHT (0.01 g), dibutyltin dilaurate (0.01 g), and isophorone diisocyanate (30.3 g, 0.1365 moles, 0.273 equivalent), while stirring in a dry nitrogen atmosphere and maintaining the reaction temperature below 80° C. After the initial reaction, the reaction mixture is maintained at 65° C. for 1.5 hours. The cooled reaction mixture is titrated for isocyanate content to determine the number of equivalent of hydroxyethyl (meth)acrylate and N-cyclohexylaminomethyltrimethoxysilane required to form the urethane-and urea-containing acryloxy and trimethoxysilane end-capped polymer. The isocyanate end-capped polyether polyol is used in Examples 5, 6 and 7 to synthesize polyether polyol having a molecular weight of about 3346 g/mole and end-capped polymer containing various ratios of (meth)acryloxy to trimethoxy silane end-cap.

Example 5

The intermediate prepared in Example 4 is further reacted in accordance with reaction scheme 2, steps 2 and 3 to produce a 2/1 (meth)acryloxy trimethoxy silane endgroup in accordance with the dual curing compositions of the present invention.

To the reaction mixture from Example 4, is added 2-hydroxyethyl methacrylate (26/15 g, 0.182 mole, 0.182 equivalent), while stirring in dry nitrogen. The reaction mixture is maintained at 65° C. for 1.5 hours, after which the isocyanate content is determined for the next step in this synthesis. N-cyclohexylaminomethyltrimethoxysilane (21.23 g, 0.091 mole, 0.091 equivalent) is added and the reaction mixture is maintained at 65° C. for another 1.5 hours herein while stirring under nitrogen, yielding about 290 g (93% yield) of dual curing polymeric composition, containing about 76% polyether polyol, with a mole ratio of urethane-containing (meth) acryloxy endgroups to urea-containing trimethoxysilane endgroups of 2/1. The theoretical molecular weight is 3811 g/mole, the theoretical weight % residual isocyanate is less than 0.2 weight %, and the methanol content is 3.0 weight %.

Example 6

The intermediate prepared in Example 4 is further reacted in accordance with reaction scheme 2, steps 2 and 3 as follows to produce a dual curing composition of the present invention.

To the reaction mixture from Example 4 is added 2-hydroxyethylmethacrylate (13.07 g, 0.091 mole, 0.091 equivalent) while stirring in dry nitrogen. The reaction mixture is maintained at 65° C. for 1.5 hours, after which the isocyanate content is determined for the next step in this synthesis. N-cyclohexylaminomethyltrimethoxy silane (42.46 g, 0.182 mole, 0.182 equivalent) is added and the reaction mixture is maintained at 65° C. for another 1.5 hours while stirring under nitrogen, yielding 298.7 (92%) of a dual curing polymeric composition, containing 73.5 weight % polyetherpolyol, with a mole ratio of urethane-containing acryloxy endgroups to urea-containing trimethoxysilane endgroups of 1/2. The theoretical molecular weight is 3928 g/mole, the theoretical weight % residual isocyanate is less than 0.2 weight %, and the methanol content is about 5.3 weight %.

Example 7

The intermediate prepared in Example 4 is further reacted in accordance with reaction scheme 2, steps 2 and 3 as follows to produce a dual curing composition of the present invention.

To the reaction mixture from Example 4 is added 2-hydroxyethyl methacrylate (15.75 g, 0.1355 mole, 0.1355 equivalent) while stirring in dry nitrogen. The reaction mixture is maintained at 65° C. for 1.5 hours, after which the isocyanate content is determined for the next step. N-cyclohexylaminomethyltrimethoxysilane (31.6 g, 0.1355 mole, 0.1355 equivalent) is added and the reaction mixture is maintained at 65° C. for another 1.5 hours while stirring under nitrogen, yielding 291.3 g (92%), of a dual curing polymeric composition, containing 75.4% of polyol with a mole ratio of urethane-containing (meth)acryloxy endgroups to urea-containing trimethoxysilane endgroups of 1/1. The theoretical molecular weight is 3918 g/mole and the methanol content is 4.5 weight %.

Example 8

The dual curing reactive polymer of Example 1 was admixed with a tin moisture cure catalyst (dibutyltin dilaurate) and subjected to ambient conditions for about 24 hours. The material cured to a flexible resin.

Example 9

The dual curing reactive polymer of Example 1 was admixed with 1-hydroxy-cyclohexyl-phenyl-ketone photoinitiator (commercially available as IRGACURE 184 from Ciba Specialty Chemicals, Inc.) and exposed to UV photoradiation. The UV source is a Fusion System UV chamber with H bulbs. The composition was cured by UV with an intensity of about 75 mw/cm² for about 30 seconds to about two minutes. The cured material was a flexible resin.

Example 10

The dual curing reactive polymer of Example 1 is admixed with 1-hydroxy-cyclohexyl-phenyl-ketone photoinitiator (commercially available as IRGACURE 184 from Ciba Specialty Chemicals, Inc.). The composition is exposed to UV radiation as in Example 9, and then further admixed with a tin moisture cure catalyst (dibutyltin dilaurate) and subjected to ambient conditions for about 24 hours. The cured material was a flexible resin.

What is claimed is:
1. A composition of matter comprising the structure:

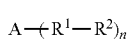  (I)

wherein A is a polyether or polyester polyol backbone, comprising the structure:

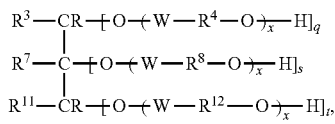

Wherein R is H or

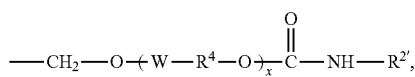

which may be further substituted by R to extend the polyol backbone up to six total alcohol groups per each polymeric structure, and
where $R^{2'}$ is:
(i) an alkylene (meth)acrylate terminated urethane containing linkage; or
(ii) an alkylenealkoxysilyl terminated linkage;
where $R^3$, $R^7$ and $R^{11}$ may be the same or different and are each H or $C_{1-6}$ alkyl; $R^4$, $R^8$ and $R^{12}$ may be the same or different and are each alkylene $C_{1-6}$, W is free valency or

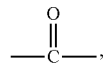

x is 1 to 40, q is 0.1 to 1, s is 0.1 to 1, and t is 0.1 to 1, where q, s and t together are no more than 3;
$R^1$ is a carbamoyl containing linkage or a hydrocarbon diradical joined to A through a carbamoyl linkage; and
$R^2$ is a member selected from the group consisting of:
(A) (i) an alkylene (meth)acrylate terminated urethane containing linkage; and (ii) an alkylene alkoxysilyl terminated linkage; or
(iii) an alkylene alkoxysilyl terminated urea containing linkage,
provided that greater than one of group (i) and at least one of group (ii) or (iii) are present;
or
(B) (i) a photocurable portion comprising a urethane or carbamate linkage terminated with a (meth)acryloxyalkyl group;
(ii) a moisture curable portion terminated with a polyalkoxysilyl group; and
(iii) a moisture curable portion comprising a urea linkage terminated with an alkylpolyalkoxysilyl group, provided that there are present: (a) at least two photocuring portions and at least one moisture curing portion; or (b) at least two moisture curing portions from the same group and at least one photocuring portion, and n is >2 up to 6.

2. The composition of claim 1, further comprising a photoinitiator.
3. The composition of claim 1, further comprising a moisture cure catalyst.
4. The composition of claim 1, further comprising a hydroquinone stabilizer.
5. The composition of claim 1, wherein said polyol is a polypropyleneoxide polyol.
6. The composition of claim 1, wherein said photocurable portion comprising a urethane or carbamate linkage terminated with a (meth)acryloxyalkyl group is formed by reacting a diisocyanate with an hydroxyalkyl (meth)acrylate in amounts sufficient for retaining isocyanate functionality.
7. The composition of claim 6, wherein the diisocyanate is isophorone diisocyanate.
8. The composition of claim 6, wherein the hydroxyalkyl (meth)acrylate is hydroxyethyl acrylate.
9. A composition of matter comprising the structure:

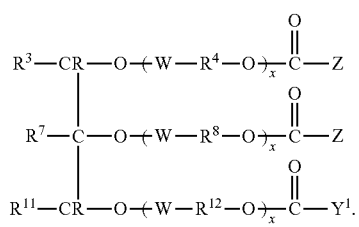  (II)

wherein $R^3$, $R^7$ and $R^{11}$ may be the same or different and are each H or $C_{1-6}$ alkyl;
$R^4$, $R^8$ and $R^{12}$ may be the same or different and are each alkylene $C_{1-6}$;
R is H or

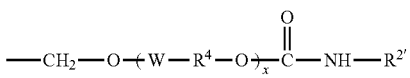

which may be further substituted by R to extend the polyol backbone up to six total alcohol groups per each polymeric structure, and
wherein $R^{2'}$ is a member selected from the group consisting of:
(i) an alkylene (meth)acrylate terminated urethane containing linkage; or
(ii) an alkylenealkoxysilyl terminated linkage (iii) an alkyene (meth)acrylate terminated methane containing linkage; and
(iv) an alkylenealkoxysilyl terminated urea containing linkage;

W is a free valency or

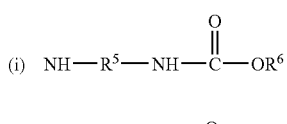

x is 1-40;
Z is:

(i) 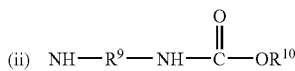

or:

(ii) $NH-R^9-NH-\overset{\overset{O}{\|}}{C}-OR^{10}$ $R^5$ and $R^9$ may be the same or different and are $C_{2-20}$ substituted or unsubstituted divalent organic radicals;
$R^6$ and $R^{10}$ are each (meth)acryloxyalkyl groups;
$Y^1$ is: $NH-R^{13}$ or

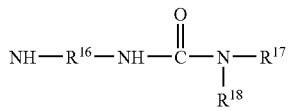

wherein $R^{13}$ is:

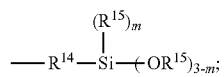

m=0 or 1;
$R^{14}$ and $R^{15}$ are $C_1$-$C_3$ alkyl; and
$R^{17}$ is a $C_{1-13}$ alkylpolyalkoxysilyl group; and
$R^{18}$ is a $C_{1-10}$ alkyl or cycloalkyl group.

10. A method of forming a gasket assembly, comprising the steps of:
    (a) applying the composition of claim 1 to at least one of two substrate surfaces;
    (b) exposing the composition to moisture and/or photoradiation to effectuate at least partial cure; and
    (c) mating the substrate surfaces in abutting relationship to form the gasket assembly.

11. A method for using the composition of claim 1 to seal together two substrates, comprising the steps of:
    (a) applying the composition to at least one of two substrate surfaces;
    (b) mating the substrate surfaces in abutting relationship to form an assembly;
    (c) exposing the composition to moisture and/or photoradiation; and
    (d) maintaining the abutting relationship for a time sufficient to allow the composition to cure.

* * * * *